Figure 1:
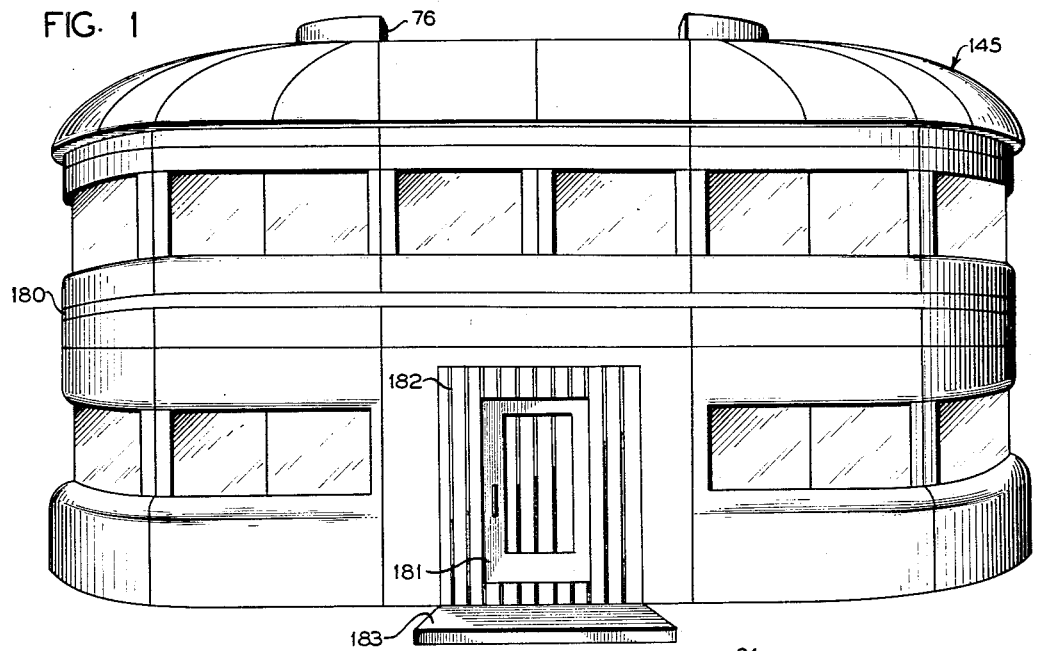

Aug. 23, 1955     G. M. MARROW     2,715,953
HOUSE

Filed March 31, 1947     10 Sheets-Sheet 1

INVENTOR.
G. M. MARROW
BY
A. Yates Dowell
ATTORNEY

Aug. 23, 1955 G. M. MARROW 2,715,953
HOUSE
Filed March 31, 1947 10 Sheets-Sheet 3

INVENTOR.
G. M. MARROW
BY
A. Yates Dowell
ATTORNEY

Aug. 23, 1955        G. M. MARROW        2,715,953
HOUSE
Filed March 31, 1947        10 Sheets-Sheet 4
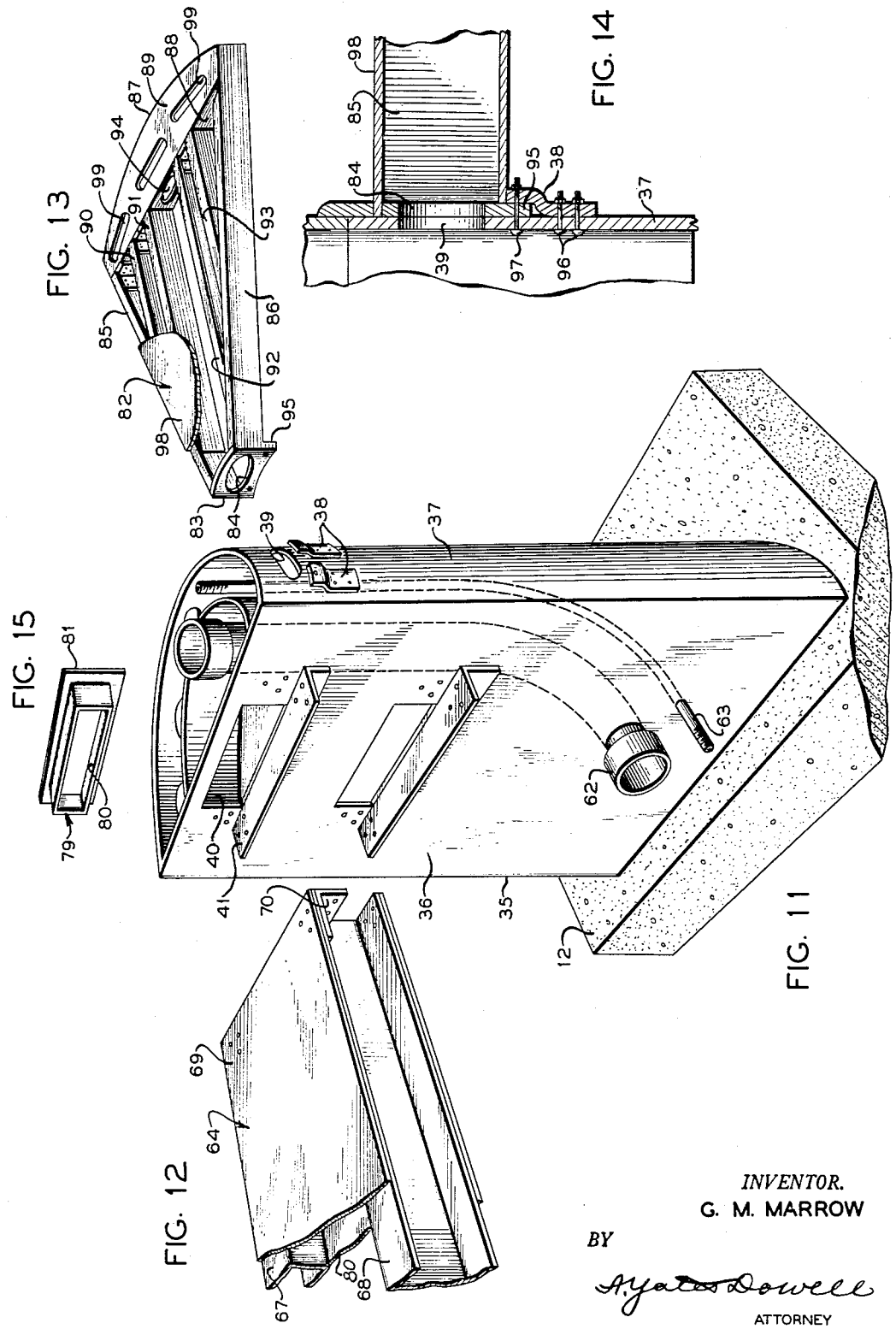
INVENTOR.
G. M. MARROW
BY
A. Yates Dowell
ATTORNEY

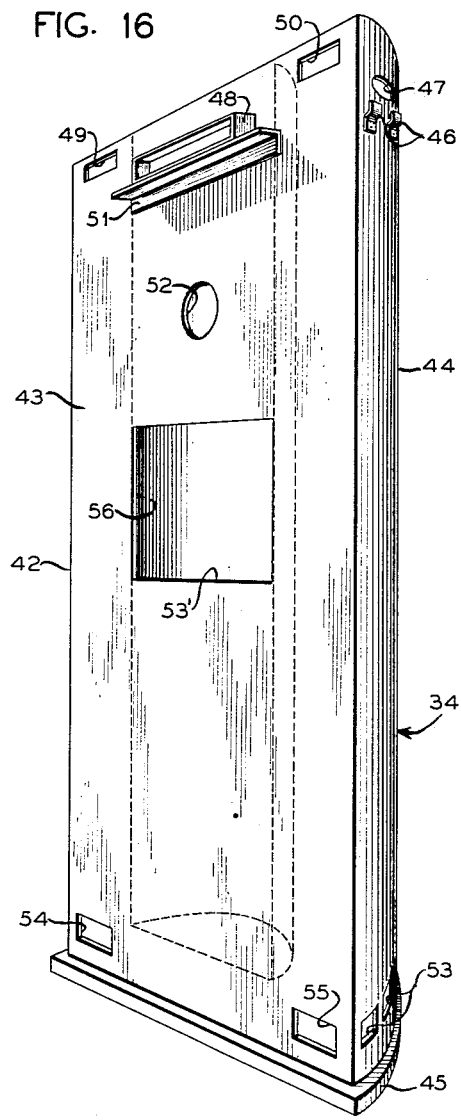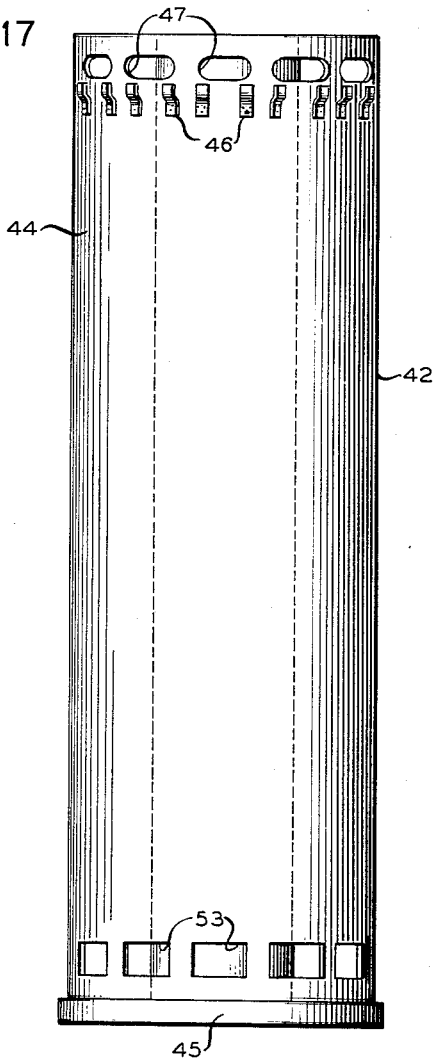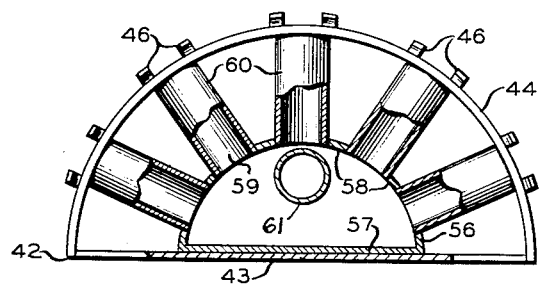

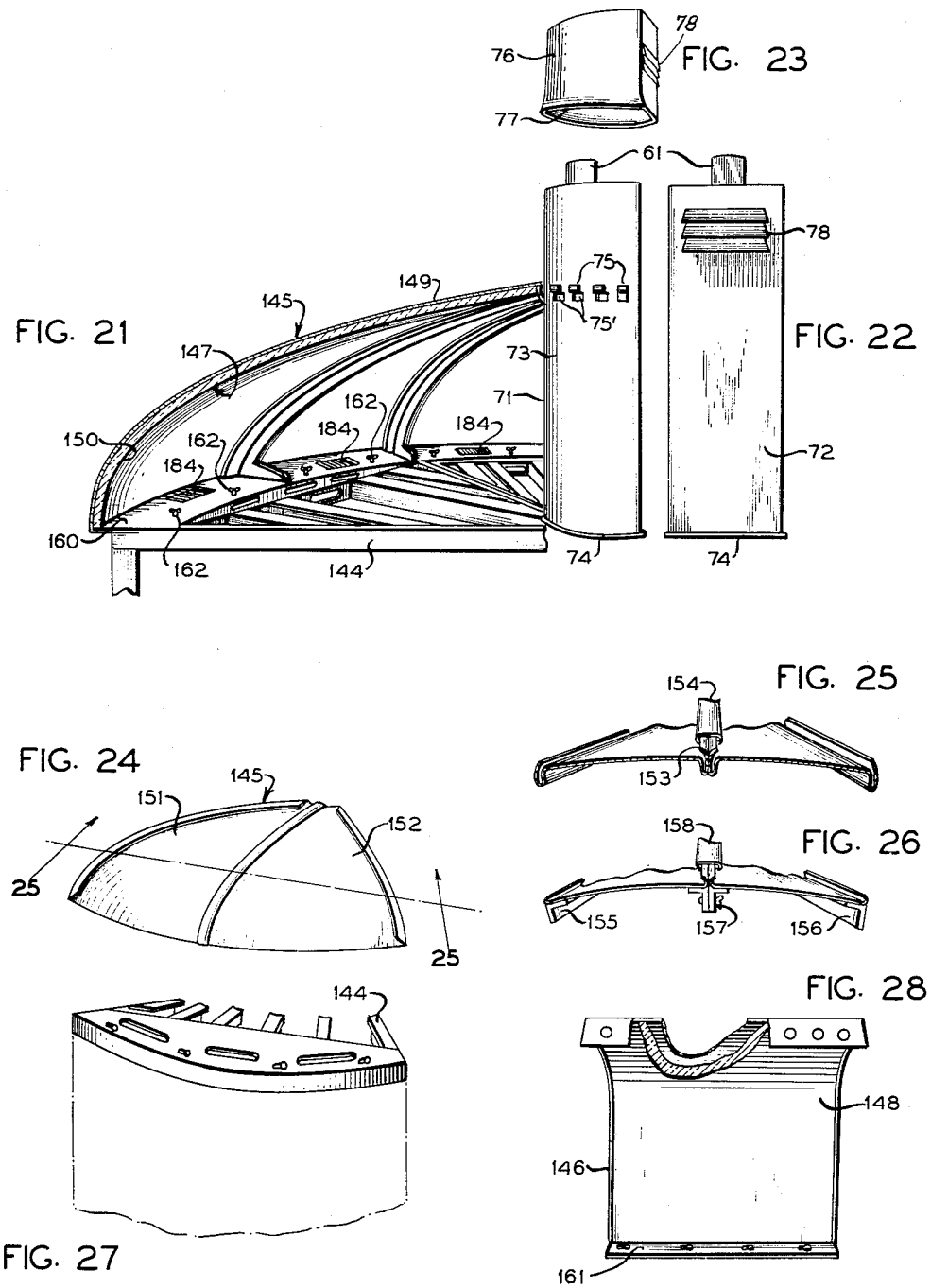

Aug. 23, 1955     G. M. MARROW     2,715,953
HOUSE
Filed March 31, 1947     10 Sheets-Sheet 8
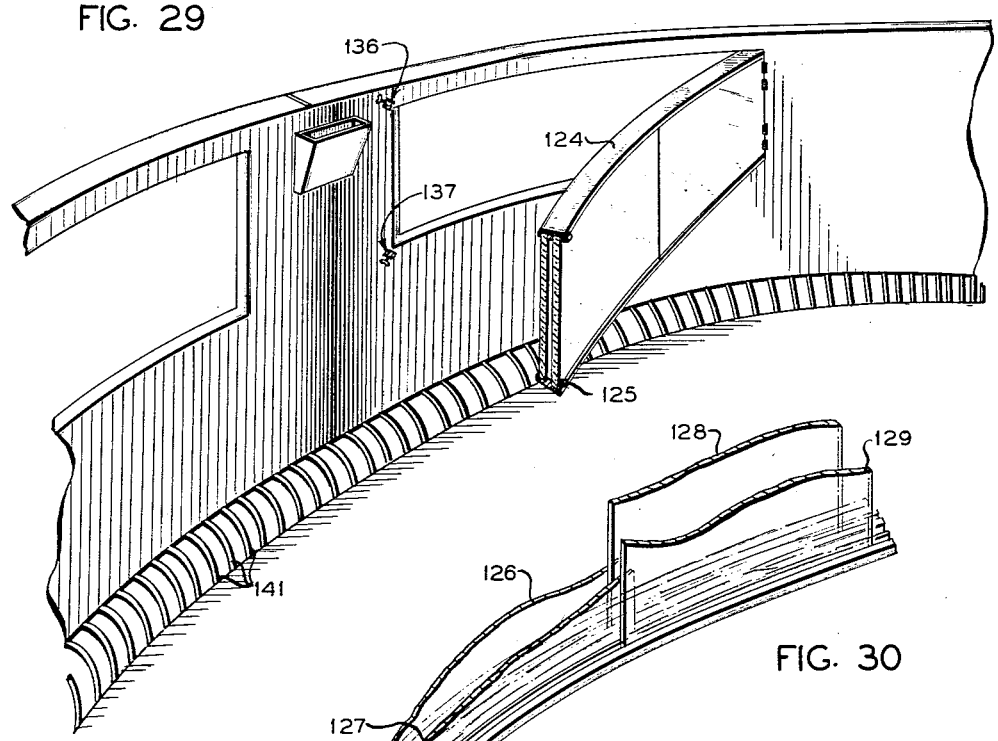
FIG. 29
FIG. 30
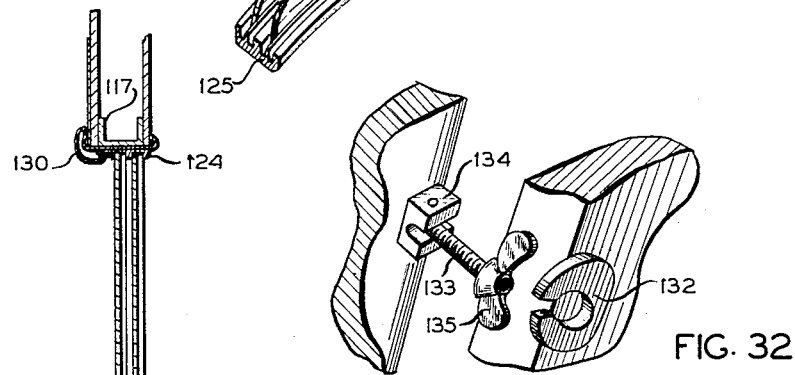
FIG. 31
FIG. 32
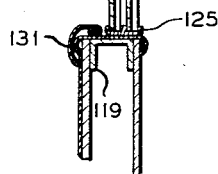
INVENTOR.
G. M. MARROW
BY
A. Yates Dowell
ATTORNEY Aug. 23, 1955  G. M. MARROW  2,715,953
HOUSE
Filed March 31, 1947  10 Sheets-Sheet 9
FIG. 33
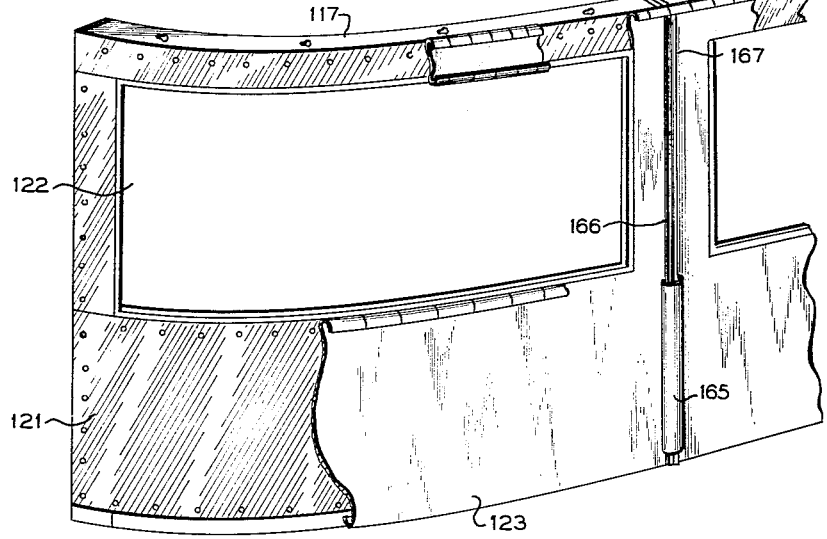
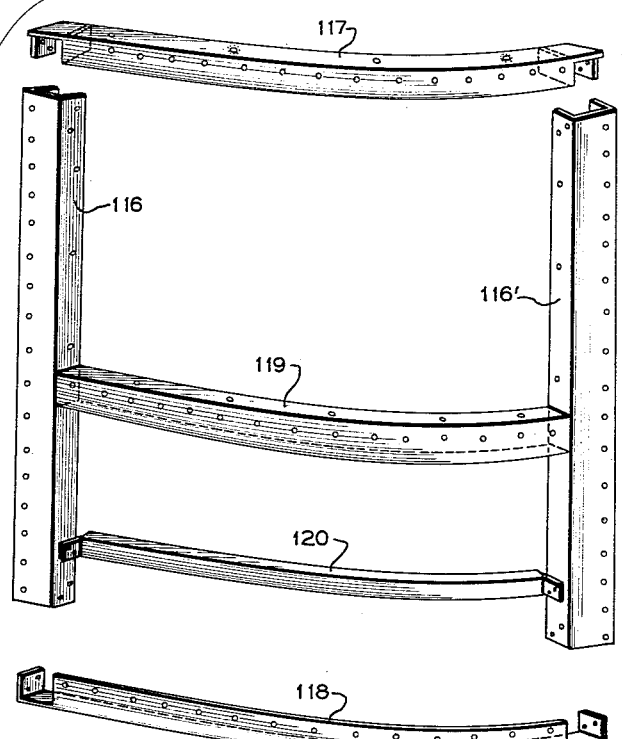
FIG. 34
*INVENTOR.*
G. M. MARROW
BY
*A. Yates Dowell*
ATTORNEY

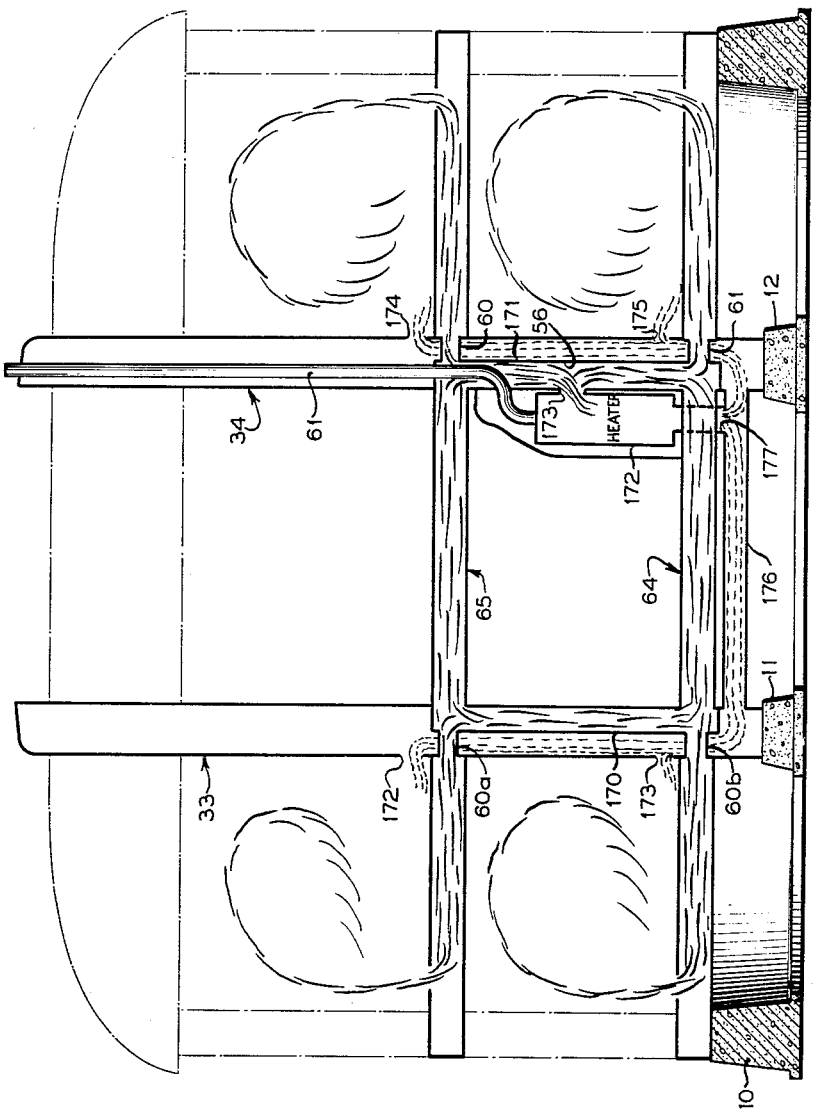

United States Patent Office 2,715,953
Patented Aug. 23, 1955

2,715,953

HOUSE

George M. Marrow, Brattleboro, Vt.

Application March 31, 1947, Serial No. 738,383

3 Claims. (Cl. 189—1)

This invention relates to improvements in building construction, and particularly to improvements in that class of buildings known as prefabricated buildings, and to improvements in the method of producing such buildings.

The subject of prefabricated buildings has received a great amount of attention for a number of years and this attention has greatly increased during the present housing shortage as this type of building construction appears to offer a manner of producing a large number of satisfactory dwelling units in the minimum amount of time.

Previously proposed buildings produced on a factory prefabrication basis have not met with a great deal of popularity and have been subject to various objections and defects which have prevented this method of producing building units from achieving the apparently indicated high degree of commercial success, especially in the production of units such as dwelling houses and relatively small industrial buildings.

A great deal of the difficulty experienced in previous attempts to produce prefabricated dwelling houses has been due to the tendency of the designers to closely follow the plans and imitate the appearance of conventional houses of the on location type of construction and to attempt to use the same materials and the same general method of construction as are used in building such houses on location.

Some of the results of this tendency to imitate and copy existing conventional building construction has been the production of prefabricated buildings having definite unsightly seams and joints where the various structural units on the buildings are fastened together, weakness of the buildings due to the lack of any unitary supporting frame structure, plumbing and wiring service difficulties due to the inclusion of the plumbing and wiring equipment in sealed panels where access to them is extremely difficult and necessitates injuries to the structure of the units or panels in which such equipment is included, the failure to obtain the maximum benefits of convenience, heat insulation and window area possible with this method of construction, and an insufficient price differential between prefabricated buildings and buildings constructed on location which latter type of building construction because of use, tradition, and other factors is more popular with the general public.

It is among the objects of the present invention to provide a building adaptable to construction by prefabrication of its various components, which building is especially designed to obtain the maximum advantages of this modern method of building construction rather than to imitate or copy conventional building plans and construction, which requires only a relatively small number of structural units so that it is simple and inexpensive to erect and which is subject to expansion and variation by the rearrangement and addition of standardized units so that no special type units are required to provide buildings of different sizes and shapes; does not have unsightly joints and seams and has a structural strength at least as great as the conventional on location type of building construction and, because of the improved construction, arrangement and method of production, affords a favorable cost differential that is more than sufficient to overcome any public prejudice against the prefabricated type of building construction.

A further object resides in the provision of an improved building, such as a dwelling house, having special plumbing and wiring containing units arranged for easy accessibility to the plumbing and wiring components, and having heating and ventilating ducts provided as structural parts of the building and automatically joined together in the proper arrangement by assembly of the prefabricated structural components of the building.

A still further object resides in the provision of an improved building construction containing a relatively small number of standardized structural units which may be assembled to constitute a completed structure supported independently of any room partition structure.

An additional object resides in the provision of an improved housing unit formed of prefabricated structural units providing walls, floors, roof and internal supports arranged to relieve the internal partition units of all building loads and having internal partitions adapted to be arranged in any desired manner to divide the internal space into rooms, closets, or other compartments.

Another object resides in the provision of an improved building construction which may be erected as a single story or 2 story building and may be changed in floor plan arrangement, size and shape by the addition of standardized structural units and in which only a few different kinds of structural units are required to erect a building of any desired shape, size or arrangement.

Yet another object resides in the provision of an improved prefabricated building having a much greater window area than is provided in the conventional building of similar character, in which the windows are easily removable and replaceable, which is effectively insulated against heat transfer, and which is pleasing and attractive in appearance.

Another object resides in the provision of an improved method for manufacturing standardized structural components for a prefabricated type of building and for assembling such components together to provide a completed building.

Figure 2:
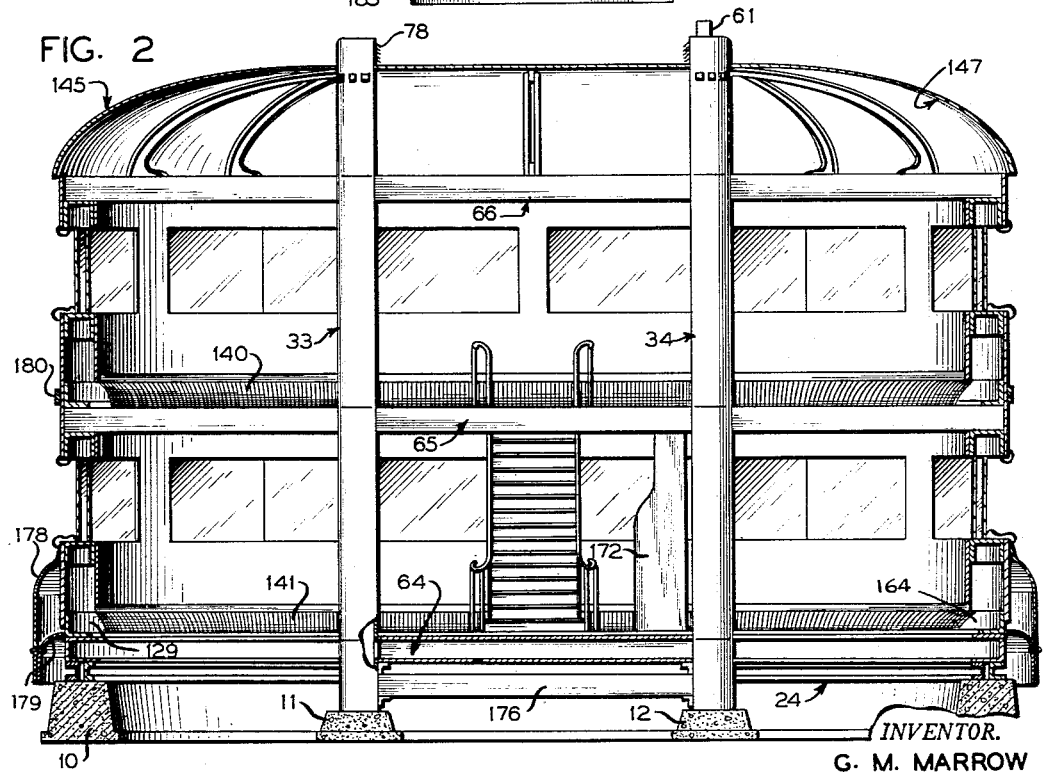
Figure 3:
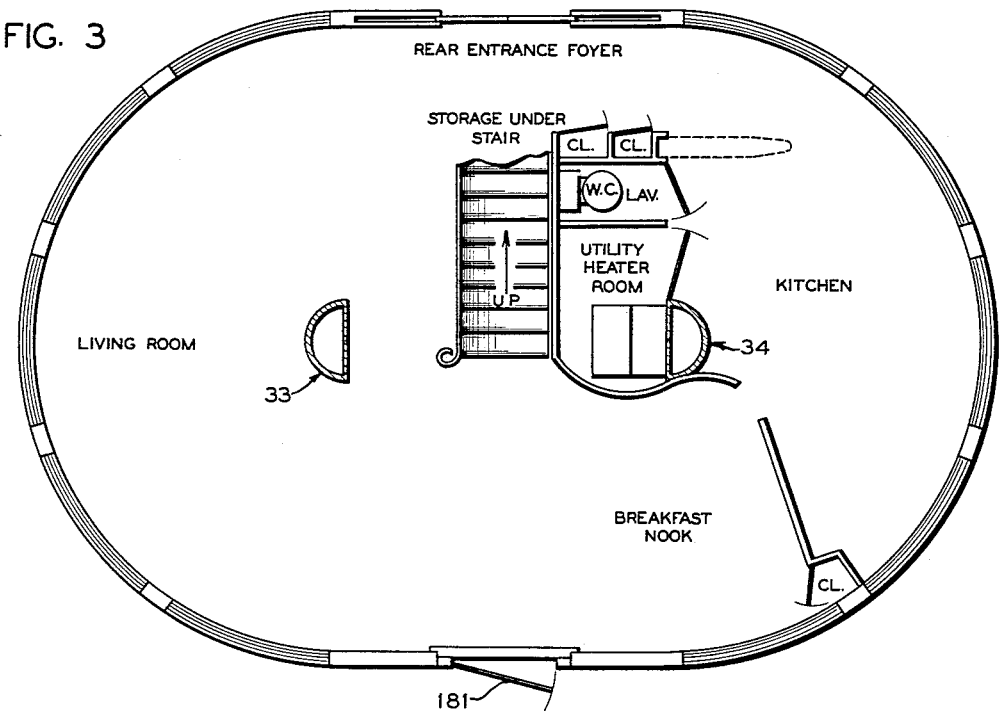
Figure 4:
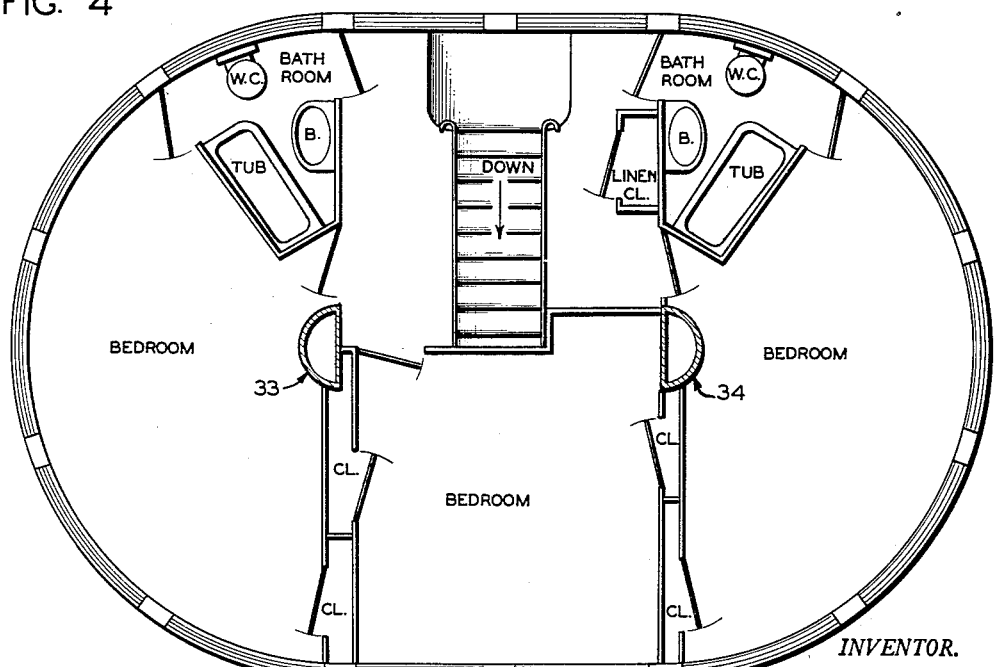
Figure 5:
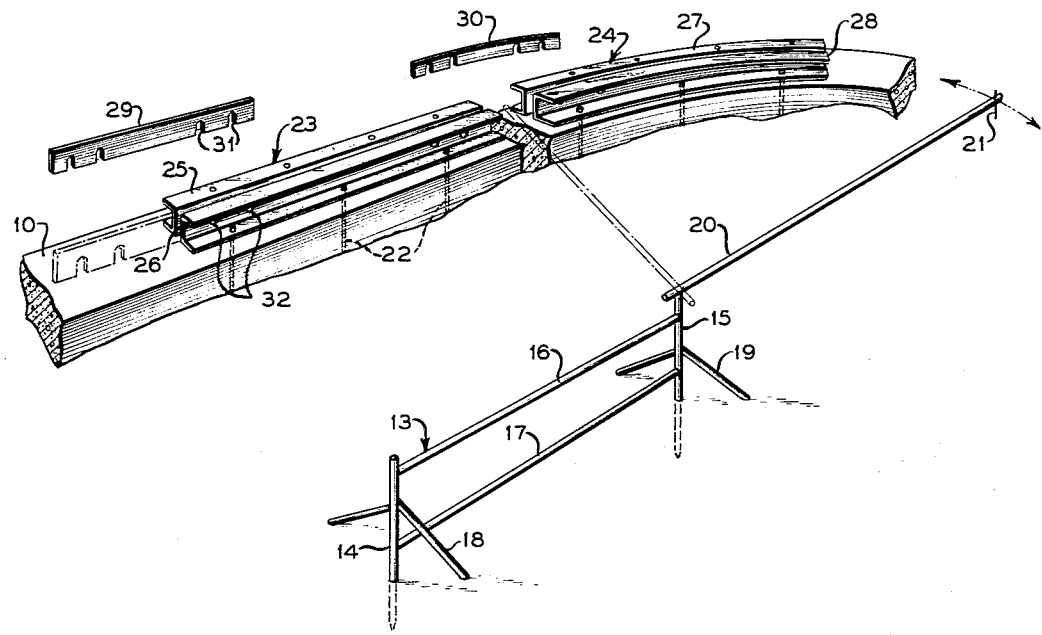
Figure 6:
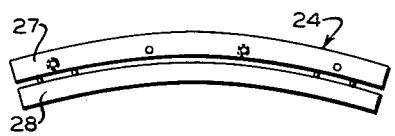
Figure 7:
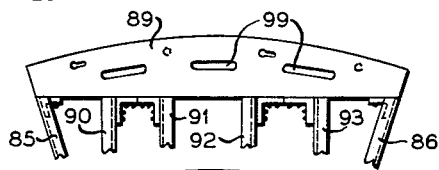
Figure 8:
Figure 9:
Figure 10:
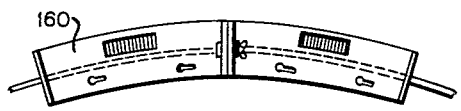

Other objects and advantages will become apparent from a consideration of the following description in conjunction with the accompanying drawings, wherein:

Fig. 1 is a front elevational view of a prefabricated building illustrative of the invention;

Fig. 2 a vertical, longitudinal sectional view of the building illustrated in Fig. 1;

Fig. 3 a suggested floor plan of the first floor of the building illustrated in Fig. 1;

Fig. 4 a suggested floor plan of the second floor of the building illustrated in Fig. 1;

Fig. 5 a somewhat diagrammatic perspective view illustrating the method of providing a suitable foundation and primary supporting structure for the building;

Fig. 6 a top plan view of a curved section of a supporting sill or base section which supports the wall units on the house foundation;

Fig. 7 a plan view of a fragmentary portion of the framework of a floor unit of the house;

Fig. 8 a top plan view of the bottom frame member of a wall unit with upright members in place;

Fig. 9 a top plan view of the top frame member of a curved wall unit;

Fig. 10 a top plan view of two united components of a roof section for the house;

Fig. 11 a perspective view of the bottom section of a hollow internal support member.

Fig. 12 a perspective view of a fragmentary portion of a structural frame member which extends between a pair of spaced internal support members the lower section of one of which is shown in Fig. 11, said structural frame member providing internally thereof a duct for ventilating air.

Figure 19:
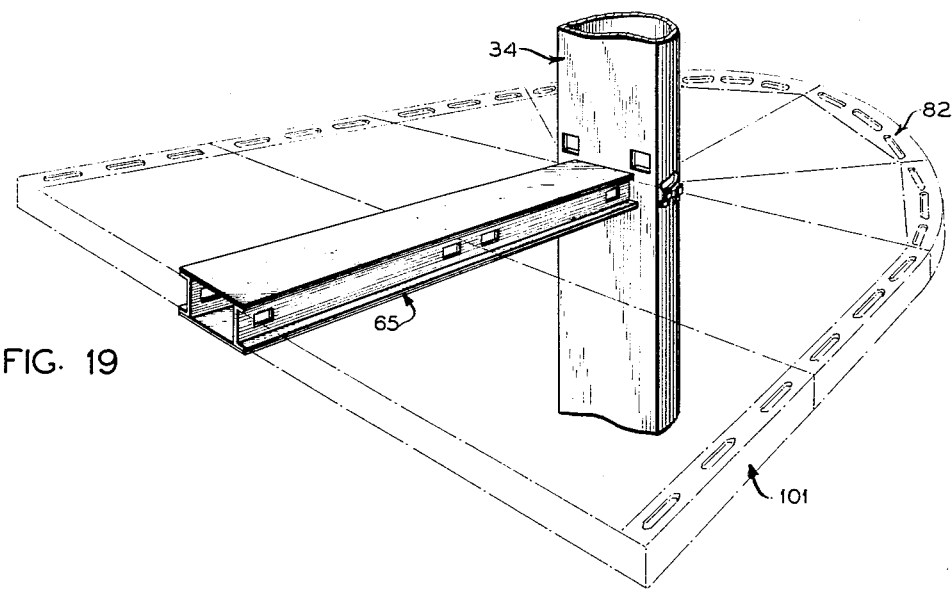
Figure 20:
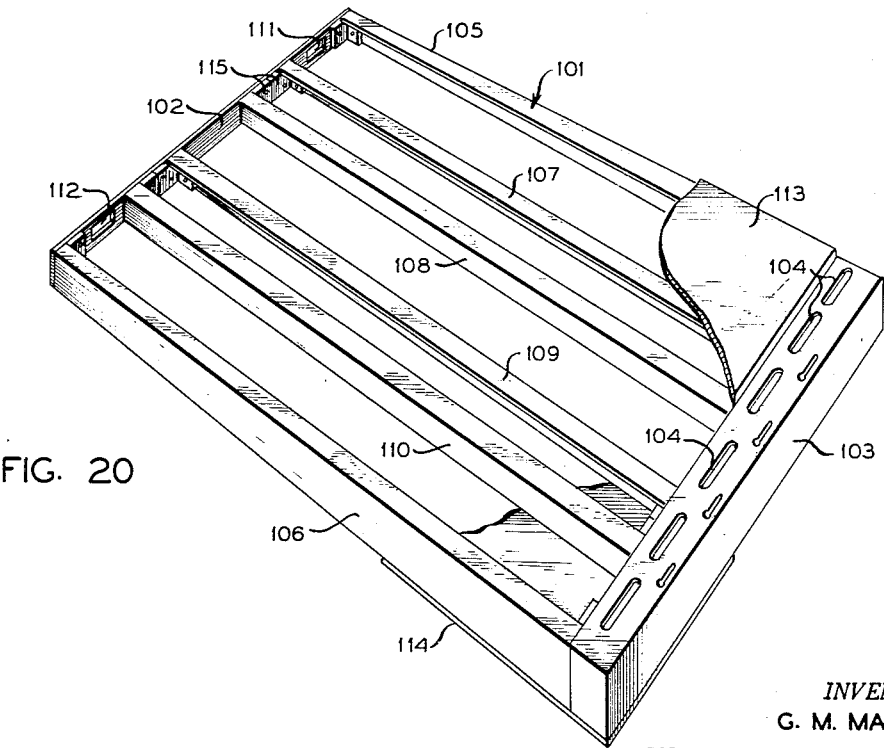

Fig. 13 a perspective view of the complete floor unit frame showing the manner of providing the ventilating air duct therein;

Fig. 14 a fragmentary detailed view showing the manner of connecting the floor unit to the central support unit and for registering the floor unit air duct with an air flow aperture provided in a section of a vertical internal support unit;

Fig. 15 a perspective view of a flanged coupling for connecting the interior of the support unit of Fig. 11 with the interior of the combined beam and duct shown in Fig. 12;

Fig. 16 a perspective view of the first floor section of one of the internal, vertical supporting units;

Fig. 17 a vertical elevational view of the units shown in Fig. 16 showing the side opposite that shown in Fig. 16;

Fig. 18 a top plan view of the unit shown in Fig. 16 portions being broken away and shown in sections to better illustrate the construction thereof;

Fig. 19 a perspective view of a fragmentary portion of an internal, vertical supporting unit and an internal horizontal supporting unit showing the manner in which these units are assembled and showing the relationship of the structural floor components to these units;

Fig. 20 a perspective view of the frame of a floor structural unit of rectangular shape;

Fig. 21 a perspective view of the interior of a fragmentary portion of the roof of the building and the attic section of one of the vertical internal supporting units showing the manner in which the roof components are assembled with the ceiling structure of the building and with the vertical internal supporting units;

Fig. 22 a vertical elevational view of the internal vertical supporting unit shown in Fig. 21;

Fig. 23 an external cap for the upper section of the internal vertical supporting unit shown in Figs. 21 and 22;

Fig. 24 a perspective view of two assembled curved roof components;

Fig. 25 a sectional view on the line 25—25 of Fig. 24 showing the manner in which the two parts of the component 24 are assembled to constitute the complete structural roof unit;

Fig. 26 a sectional view similar to Fig. 25 showing the manner in which two adjacent structural roof units are joined together;

Fig. 27 a perspective view of a fragmentary portion of a structural unit of the house ceiling to illustrate the manner in which the roof components are secured to the upper surface of the main portion of the house;

Fig. 28 a perspective view of a roof structural component of rectangular shape;

Fig. 29 a perspective view of a fragmentary portion of the interior of the house showing the manner in which the warm air ventilating register and the windows are provided;

Fig. 30 a perspective view on a somewhat enlarged scale showing details of the window construction;

Fig. 31 a vertical sectional view through a window such as is illustrated in Fig. 29;

Fig. 32 a perspective view showing a fastening device for securing a window in closed position;

Fig. 33 a perspective view showing the manner in which two adjacent walls structural unit are secured together;

Fig. 34 a perspective view showing the manner in which the framework is provided for a curved wall structural unit; and, Fig. 35 a diagrammatic view showing a heating and ventilating system for the building.

With continued reference to the drawings and particularly to Figs. 1 and 2, the house, as illustrated, has two curved end portions of generally semi-circular shape spaced apart and joined by opposite straight wall portions. The illustrated house has two floors and is somewhat elliptical in plan shape. It is to be understood however that a house having a single floor or three or more floors may be provided by the improved method without in any way exceeding the scope of the invention and that the floor plan shape may be varied to provide a substantially T-shaped house or a house of cruxiform shape or one of circular shape or a house that is longer in proportion to its width than is the house illustrated, without in any way exceeding the scope of the invention and that these various shapes and sizes may be provided by the use of additional building structural units identical with those illustrated in Figs. 1 and 2 and hereinafter described in greater detail.

As is shown in Fig. 2 the house is supported upon a continuous external foundation wall 10 and upon two internal foundation piers 11 and 12.

In order that the outer foundation wall may be of the proper size and shape to accurately receive the lower edges of the house wall, a measuring gauge, generally indicated at 13 in Fig. 5, is provided. This gauge comprises two upright posts 14 and 15 joined together in space parallel relationship by a pair of substantially parallel bars 16 and 17, the length of the bars 16 and 17 being substantially equal to the distance between the centers of curvature of the semicircular shaped end portions of the house. The lower end portions of posts 14 and 15 are sunk in the ground at the desired location of the two centers of curvature and are braced in position by suitable braces as indicated at 18 and 19. A measuring bar 20 is then pivotally connected to top end of one of the posts and swept over an arc of 180 degrees. The bar 20 has a marker 21 attached to the outer end thereof to provide a suitable mark for locating the corresponding end portions of the foundation wall. The measuring rod is then pivotally mounted upon the top end of the other post and swept over an arc of 180 degrees to locate the opposite semicircular end portion of the foundation wall. The arcuate end portions are then joined by straight lines to locate the straight sections of the foundation wall and the footing trench is then dug along the indicating marks so provided. The concrete of the foundation wall will then be poured and anchoring bolts, as indicated at 22, positioned therein, the gauge 13 being used to accurately determine the location of these anchoring bolts.

The gauge may then be removed and the piers 11 and 12 provided centered on the holes in which the posts 14 and 15 were located.

Supporting sills or base members are then mounted on the top of the outer foundation wall and secured in place by the anchoring bolts. These sills may conveniently be formed in relatively short sections as generally indicated at 23 and 24, the section 23 being a straight section and the section 24 being a curved section. Each section may comprise a pair of similar structural iron members of channel shaped cross section, as indicated at 25 and 26 for the section 23, and 27 and 28 for the section 24, and secured in assembled position resting on the upper surface of the foundation wall and secured thereto by the anchoring bolts. The channel members are disposed in back to back relationship spaced apart to provide a narrow groove between them.

Adjacent sections of the sill are joined together by connecting bars, as indicated at 29 and 30, which are received in the groove or slot between the two component channel members of each section, and are provided in their lower edge portions with notches 31 which fit over connecting elements such as bolts or rivets 32 extending through the web portions of the two back to back channel members of each section of the sill. This construction provides a continuous metal sill or base extending entirely around the outer foundation wall.

In order to erect the building shown in Figs. 1 and 2 the following components of convenient size and weight may be used:

Ten curved roof segments.
Four rectangular roof segments.
Thirty curved floor sections.
Eleven rectangular floor sections.
One stairwell.
Twenty curved wall sections.
Four straight wall sections.
Two straight door sections.

It thus requires a total of 82 standardized prefabricated structural units for the roof, floors and walls of the building. In addition, two complete internal vertical supporting units and three internal horizontal supporting units will be required.

The two vertical internal supports for the building are generally indicated at 33 and 34 in Fig. 2 and may be substantially identical in construction so that a detailed description of only one is sufficient for the purposes of this disclosure.

Each one of these units comprises a series of vertically arranged sections, each section provided with means for securing to it the section next below and also for attaching the horizontal internal support members and the floor and ceiling units thereto.

The bottom section of one of the vertical internal support units is illustrated in perspective in Fig. 11 as indicated at 35. This member 35 is a hollow metal member of generally semicircular cross-sectional shape and may conveniently be formed of thin metal, a heavy gauge sheet metal having sufficient strength for most applications.

The member 34 rests at its bottom on the concrete foundation pier, for example the pier 12, and the section 35 has a substantially flat wall 36 to the edges of which is connected a curved wall 37. A plurality of brackets 38 are secured to the curved wall 37 near the upper end thereof and between the brackets 38 and the top of the section the wall 37 is provided with a plurality of spaced elongated apertures 39. The flat wall 36 is provided near its top with an elongated rectangular aperture 40 and carries a shelf 41 immediately below the aperture.

The first or second floor section of an internal vertical support unit is shown in Figs. 16, 17 and 18 and is indicated at 42. Each of these sections is also hollow and generally semicircular in cross-section having a flat wall 43 and a curved wall 44 of generally semicircular sectional shape. At its lower end the section 42 is provided with a supporting flange 45 and is provided near its top with a plurality of brackets 46 to receive the floor sections at the upper end of the support section. This section has a plurality of elongated apertures 47 in the curved wall 44, and elongated apertures 48 in the flat wall and two elongated apertures 49 and 50 in the flat wall, disposed one on each side of the central elongated aperture 48. A shelf 51 is secured to the flat wall 43 immediately below the central aperture 48. The flat wall 43 of one section is also provided with an additional circular aperture 52 below the shelf 51 to receive a heater smoke pipe, and each section has in the lower end portion of the curved wall thereof a number of apertures 53. The flat wall has in its lower portion similar apertures 54 and 55. An access opening 53' is provided in the vertical support unit.

An inner hollow member 56 of generally semicircular cross-sectional shape is disposed within the section 42, as is clearly illustrated in Fig. 18, with its flat wall 57 against the inner surface of the flat wall 43 of section 42 and its curved wall 58 uniformly spaced from the curved wall 44 of section 42. This inner member 56 is provided with a plurality of apertures 59 corresponding to the apertures 47 of section 42, and the apertures 59 are connected with the apertures 47 by respective conduits 60 which are radially disposed between the inner member 56 and the curved wall 44 of the section 42. A conduit 61 extends through the inner member 56 and constitutes a flue or chimney for a heating unit.

Plumbing lines, as indicated by the sewer pipes 62 and electric wiring conduit 63 of Fig. 11, also extend through the sections of the vertical internal supports to the different floor levels of the building where they are connected with branch lines which lead to the various plumbing fixtures and electric outlets of the building.

The internal horizontal supports are generally indicated at 64, 65 and 66 in Fig. 2, three supports being required for a two story building. The two internal vertical units 33 and 34 are mounted on the corresponding piers 11 and 12 in the manner such that the flat walls of the two vertical units face each other and are substantially parallel with corresponding shelves 41 at the same level. The internal horizontal supports are all similar in construction and a fragmentary portion of one of them, for example the bottom support 64, is illustrated in detail in Fig. 12.

As illustrated, this support is in the form of a beam having two parallel spaced apart structural iron members of channel section, as indicated at 67 and 68, with plates 69 and 70 secured to the flanges of the channel members to provide a beam of generally rectangular cross-section. The ends of these beams rest upon corresponding shelves 41 secured to the flat walls of the two parallel vertical support units and the beams are provided at their ends with angle brackets, as indicated at 70 in Fig. 12, which are secured to the flat walls of the vertical support units to firmly secure the corresponding ends of the horizontal supports to the flat walls of the two vertical internal support units.

The bottom flange 45 of each first and second floor section of the vertical internal support units are shaped to fit tightly over the upper edge portion of the next lower section so that the various sections are supported against lateral slippage with respect to each other. When the horizontal internal support units are secured to the vertical units an internal supporting frame structure is provided extending upwardly through the center portion of the house.

Figs. 21 and 22 show an upper or attic section for an internal vertical support unit, this section being indicated at 71, which also comprises a flat wall 72 joined at its edges to a curved wall 73, the section being provided at its bottom with a flange 74 which fits upon the upper end of the upper story section of a two story house or upon the upper end of the first floor section of a one story house. The section 71 is provided with brackets 75 to receive adjoining roof panels and secure them to these sections of the internal vertical support and the upper or attic sections are capped above the roof by external caps, one of which, as indicated at 76, is illustrated in Fig. 23. The brackets 75 are preferably formed by sticking out and bending up metal tongues from the wall 73 having apertures 75' below the brackets. The cap 76 is a cup shaped member having an open end around which there is provided a flare or flange 77 to rest upon the inner edges of the corresponding roof segments such as 149, and slides down over the top section of a vertical support unit, and has a flat wall and a curved wall of substantially semi-circular shape and is provided at its end opposite its lower open end with an end wall extending over the area between the curved wall and the flat wall of the cap. In the case of a flue or chimney 61 extending upwardly through the internal support units the end wall of the cap 76 is provided with an aperture through which the upper end of the flue extends, the flue being sealed to the end wall against leakage of air and moisture. The upper end portion of the flat wall of the attic section of each internal vertical support unit may also be provided with louvered apertures, as indicated at 78. The external caps serve to make the roof weather tight at the juncture of the roof segments with the internal support units. If desired louvers may be provided in the external caps also.

Before the horizontal support units, such as the units 64, are secured to the corresponding sections of the vertical support units a flanged connecting member, generally indicated at 79 and illustrated in detail in Fig. 15, is inserted in the longitudinal aperture, such as the aperture 40, in the flat wall of the vertical support unit section. This member 79 has a rectangular box-like portion 80 which fits the aperture, such as the aperture 40, and a rectangular flange portion 81 which overlies the inner surface of the flat wall portion of the vertical unit section surrounding the aperture and is secured thereto by the rivets which secure the angle bracket 70 of the corresponding horizontal support unit to the vertical support unit section. This provides a substantially air-tight connection between the interior of each vertical support unit and the interiors of the various horizontal support units.

After the sill or base units, such as the units 23 and 24 of Fig. 5 have been secured in place on the outer foundation wall and the lower section of the vertical support units, such as the section 35 of Fig. 11, have been properly placed on the piers 11 and 12 and the lower horizontal support units, such as the unit 64, secured to the two lower sections of the vertical support units the lower floor sections are assembled in position. These sections include a number of substantially segmental sections for the round end portions of the building, such a segmental section being illustrated in Fig. 13, and a plurality of rectangular floor sections for the straight wall portions of the building, the framework of such a rectangular section being illustrated in Fig. 20.

The segmental floor section illustrated in Fig. 13 has at its smaller end a curved plate 83 shaped to closely fit the external surface of the curved wall 37 of the vertical support unit section 35, illustrated in Fig. 11. This plate is provided with an aperture 84 shaped to register with one of the apertures 39 provided in the curved wall 37 of the vertical support section. A pair of frame members 85 and 86 are secured at their inner ends to the ends of the plate 83 and at their outer ends to a hollow outer member 87 of generally rectangular cross-section having a substantially straight inner wall 88, flat upper and lower walls, the upper wall being indicated at 89, and a curved outer wall having a curvature the same as the curvature of the curved end of the building.

Additional frame members as indicated at 90 and 91 extend from the frame member 85 to the inner wall 88 of the member 87 and similar frame members 92 and 93 extend from the frame member 86 to the inner wall 88, the members 90, 91, 92, and 93 being substantially parallel and the inner members 91 and 92 being spaced apart to provide an air duct leading from the aperture 84 in plate 83 to a similar aperture 94 in inner wall 88 of the outer portion 87 of the frame. Members 90 and 91 may be formed of a single piece of thin metal bent to channel shape and members 92 and 93 may also be combined into a single unit in the same manner, if desired.

The plate 83 extends downwardly below the frame members as indicated at 95 to provide a flange engageable in the upper outwardly bent end portions of the corresponding brackets 38, as is clearly illustrated in Fig. 14. The brackets 38 are secured to the curved wall 37 by suitable fastening means such as the bolts 96 and, if desired, a bolt 97 may extend through the upper end portion of each of these brackets and through the corresponding downwardly projecting portion of the associated plate 83 to firmly secure the floor sections to the sections of the vertical internal support.

The frame structure of the segmental floor unit 82 is covered by upper and lower plates, a fragmentary portion of the upper plate being indicated at 98.

Warm ventilating air for the building is forced through the inner member 56 of the vertical support section and through the radial ducts 60 and the apertures 39 in the vertical support units. From the apertures 39 the warm venilating air will pass through the aperture 84 into each floor section and will then pass through the ducts between the frame members 91 and 92 and through the aperture 94 into the hollow outer frame portion 87 from which it will flow through elongated apertures 99 provided in the upper plate 89 of the outer frame portion and from these apertures through a suitable baseboard grill, as indicated at 141 in Fig. 2, to the interior of the building.

The rectangular floor unit 101, as particularly illustrated in Fig. 20, has a flat inner end bar 102 and a hollow outer end portion 103 of rectangular cross-section formed by four straight walls, the upper wall of which is provided with elongated apertures 104. Outer side-frame members 105 and 106 of channel or L-shaped cross-section connect the end of the inner frame member 102 with the end of the hollow outer frame member 103 and between these side frame members there are parallel intermediate frame members as indicated at 107, 108, 109 and 110. A ventilating air-duct is provided between the outer side member 101 and the adjacent intermediate member 107 and the outer side member 106 and the adjacent intermediate frame member 110. The side frame members 105 and 106 are provided at their inner ends with respective apertures 111 and 112 leading into the air-ducts at the inner end thereof and the inner wall of the hollow outer member 103 is provided with apertures at the outer end to the air-ducts which connect the air-ducts with the ventilating apertures 104. The floor section is provided with an upper cover 113 and a lower cover 114 which covers, when secured to the frame members, complete the air-ducts along each side of the floor unit. The longitudinal frame members may conveniently be secured to the end members 102 and 103 by suitable connectors such as the angle brackets 115.

As in the case of the segmental floor section, the adjacent inner parallel beams of these rectangular floor sections may be combined by providing the adjacent pair of beams 107 and 108 as a single member of channel section and the pair 109 and 110 as a similar unitary member.

The segmental floor sections are supported in position by having the inner end portions thereof engaged in the brackets 38 of the sections, such as 35, of the internal vertical supports, and the outer portions, such as 87 of these segmental floor sections, rest on the curved sill portions, such as the portion 24.

The inner ends of the rectangular floor sections are inserted into the groove between the flanges of the channel shaped side members of the internal horizontal supports, such as the member 64, and the outer ends of these rectangular floor sections rest on the straight sill sections, such as the section 23. The upper cover of each rectangular floor section is so supported that its upper surface is flush with the upper surface of the cover plate 69 of the horizontal supporting beams, such as the beam 64.

As stated above, in the assembly of the building the foundation wall and the foundation piers are provided, the sill or base sections are provided on the foundation wall, the lower section of the two vertical internal supporting units are mounted on the foundation piers and the lower horizontal supporting member is connected between these lower units of the vertical supporting units and the first floor sections are then assembled in position.

After the lower floor sections are assembled with the lower part of the internal supporting structure and the outer foundation wall, the lower wall sections are mounted in assembled position. There are three types of these lower wall sections, namely—curved sections for the curved end portions of the building, straight rectangular sections for the straight wall portions of the building and doorway sections which are straight rectangular sections provided with door openings and means for mounting doors in the corresponding openings.

The manner in which the internal support units and the floor sections are assembled together is diagrammatically illustrated in Fig. 19. The framework of a curved wall section is illustrated in Fig. 34 and the manner in which the wall sections are assembled in operative position and secured together is shown in Fig. 33.

Referring to Fig. 34, the curved wall section frame comprises a pair of parallel upright members 116 and 116' of channel shaped cross section, an upper curved frame member 117 of channel shaped cross section, a lower curved frame member 118 of angle shaped cross section, an intermediate curved member 119 of channel shaped cross section, this member being inverted; and a curved member 120 of inverted U-shaped cross section set immediately above the bottom member 118 and somewhat inwardly of the frame.

These various frame members are secured together by suitable bolts or rivets to provide a rigid and unitary frame structure and this frame is covered by inner and outer coverings.

The outer covering preferably comprises an inner layer 121 of insulating material such as commercial wall board or "celotex" which may be applied in several pieces around the window opening 122, as is clearly illustrated, and an outer layer 123 of weather resistant material, such as sheet aluminum, which is preferably applied in a single piece although several pieces may be used for the sake of economy. Around the window opening the edge of the sheet metal covering is turned inwardly over the surfaces of the frame members and the edges concealed by the window opening frame or linings.

The window construction is particularly illustrated in Figs. 29, 30 and 31. As illustrated the upper and lower members 124 and 125 of the window frame disposed within the window opening are provided with double grooves which receive the upper and lower edges of the window pane, there being four movable panes for each window as indicated at 126, 127, 128, and 129 in Fig. 30, each of these panes has a width approximately one-half the length of the window opening and is slidable in the grooves in the upper and lower window frame members.

The panes 126 and 127 are arranged and spaced in parallel relationship and the panes 128 and 129 are similarly arranged to provide a double window and the pane 126 overlaps the pane 128 and the pane 127 overlaps the pane 129 so that the corresponding sets of parallel panes may be moved along the retaining grooves past the panes of the opposite set in order to provide for opening the window.

It is contemplated that the outer glass panes may be removed in warm weather and suitable screen structures substituted therefor.

As shown in Fig. 29, the members 124 and 125 are secured together at one end by a vertical frame member which is hinged to the vertical frame member of the wall frame unit so that the entire window may be swung about this hinged connection. Preferably a slotted vertical member is also connected to the ends of the members 124 and 125 opposite the hinged connection. Hollow sealing strips, as indicated at 130 and 131 in Fig. 31, are secured one along the outer edge of the upper side of the window opening, and one along the outer edge of the lower side of the window opening to contact the window frame members 124 and 125 when the window is closed to provide a weather tight seal between the building wall and the window. These sealing members are preferably formed of relatively soft rubber and are permanently secured to the building wall adjacent to window openings in position to bear against the outer edges of the upper and lower window frame members when the window is moved to closed position. The window may be conveniently held in closed position by suitable means, such as the apertured lug 132 of Fig. 32 secured to the outer or movable end of the window frame and a thumb screw 133 secured to the building wall adjacent to the window opening by a pivotal connection 134. The lug 132 is slotted so that the threaded portion of the thumb screw may pass into it and the wing nut 135 may then be turned down on the screw threads to push the window frame against the sealing strips 130 and 131 and hold it firmly in closed position. As is illustrated in Fig. 29 two of these connections are preferably provided for each window, as generally indicated at 136 and 137.

As shown in Fig. 33 the U-shaped frame member 138, which corresponds to the frame member 120 of Fig. 34, receives the lower edge of the inner wall covering 139 and the inverted upper edge of a ventilating grill 140 which extends entirely around the upper floor of the building. A similar grill 141 extends around the lower floor of the building and has its upper edge secured in the U-shaped wall frame corresponding to the member 138. The lower edge portion of each grill is connected to the sections of the corresponding floor preferably by a snap or press fit which eliminates the necessity of using bolts or screws to fasten the grills in place. These grills cover the ventilating air apertures in the outer ends of the various floor sections and provide a passage for ventilating air into the rooms of the building.

The ceiling, as illustrated in Fig. 21, is formed of segmental units or sections, as indicated at 144, and rectangular sections, which are similar to the corresponding floor units or sections except that in the case of the ceiling sections the framework may be made somewhat lighter, the top cover plate may be omitted and it is not necessary to provide the ventilating apertures in the hollow outer portions of these sections.

The roof is formed of segmental sections, as indicated at 145 in Figs. 21 and 24, and of generally rectangular sections, as indicated at 146 in Fig. 28. All of these sections are longitudinally curved, as indicated at 147 in the case of the segmental sections and at 148 in the case of the rectangular sections. The segmental sections have their smaller upper ends secured to the upper brackets 75 of the two internal vertical support units and the rectangular sections have their upper edges secured together along the ridge or peak of the roof.

Each of the roof sections has an outer layer 149 of suitable material, such as sheet aluminum, to the under surface of which is attached a layer of insulating material 150, such as asbestos or fibre board. Each segmental roof section is formed in two parts in order to facilitate the bending of the material into the desired curved shape, the two parts of one segmental section being indicated at 151 and 152 in Fig. 24.

Suitable frame members, as indicated at 155 and 156, may be provided along the outer edges of the complete roof sections and adjacent sections may be secured together by securing these frame members together by suitable means such as wing screws as indicated at 157 in Fig. 26. The joints between the two adjacent roof sections are made water tight by providing upwardly and outwardly extending flanges 153 on the adjoining edges of the cover material and sliding cap strips 154 and 158 of somewhat C-shaped cross section over these flanges as is particularly illustrated in Figs. 25 and 26.

The wider or lower edges of the segmental roof sections are provided with inwardly extending mounting plates, as indicated at 160 in Fig. 21, and the lower edges of the rectangular roof sections are provided with similar plates, as indicated at 161 in Fig. 28. These plates are provided with apertures of keyhole shape and the upper plate of the end portions of the ceiling sections are provided with similar apertures. The roof sections may be secured to the ceiling sections by inserting fastening elements, such as the thumb screws 162, through the wider portions of the registering keyhole shaped apertures in the roof attached plates and in the outer end portions of the ceiling sections, moving these screws over to the narrower portions of these apertures and tightening the wing nuts on the screws.

After the lower sections of the internal vertical support units are placed in position on the piers 11 and 12 of the foundation, the lower horizontal support 64 is secured to these lower sections of the vertical support units, the lower floor sections are placed in operative positions on the sill or base members mounted on the outer foundation wall and secured at their inner ends to the vertical support unit sections and the lower horizontal support member. The first floor wall sections are mounted on the outer end portions of the first or lower floor sections. The wall units and outer ends of the lower floor sections may be secured to the sill or base member by inserting bolts through holes in the bottom members of the wall units 118, through holes in the top surface and lower surface of the outer ends of the lower floor sections into threaded holes provided to receive these bolts in the sill or base members 23 and 24 in Fig. 5. If desired, suitable insulating or gasket material may be placed upon the outer end portions of the floor sections before the wall sections are mounted thereon.

Access to the bolts may be had through the space between the lower edge of the inner wall covering and the lower member of the wall section, which space is indicated at 129 in Fig. 2, and is later covered by the ventilating grill 141.

After the lower floor wall sections are in place adjacent wall sections may be sealed together by sliding cap strips, as indicated at 165 in Fig. 33 slid over outwardly flared flanges 166 and 167 and provided along the adjoining vertical edges of the wall sections. The wall sections may also be more securely joined by bolts or other means between adjacent vertical members such as 116 in Fig. 34.

The lower floor sections of the internal vertical support units are then placed in position and connected together by the second floor internal horizontal support member 65.

The second floor sections are then assembled in position with their inner ends secured to the internal support members and their outer ends resting upon the upper surface of the lower floor wall sections. As these second floor sections are assembled they are first placed in position so that headed pins or rivets extending from the upper surface of the upper frame members of the first floor wall sections extend through registering holes in the lower surface of the outer ends of the second floor sections, thus accurately positioning the floor sections in place.

After the second story portions of the internal supporting sections have been secured in position the second story wall sections are placed in position on the outer ends of the second floor floor sections and the bottom of these wall sections and the outer ends of the second floor floor sections are secured into the upper frame members of the first floor wall sections by inserting bolts through holes in the bottom members of the wall units and through holes in the upper and lower surfaces of the outer ends of the second floor floor sections into threaded holes provided to receive these bolts in the upper frame members of the first floor wall sections in the manner described above in connection with securing the first floor sections to the first floor supporting units of the building.

After the second floor wall sections have been secured in assembled position the ceiling sections are assembled with their inner ends supported on the internal support structure of the building and their outer ends resting upon and secured to the upper frame members of the second story wall sections to which they are bolted or otherwise secured. The attic sections of the internal vertical support units are then placed in position and the roof segments assembled in the manner indicated above.

After the roof sections are secured in assembled relationship the external caps may be applied to the upper ends of the attic section of the internal vertical support units.

A suitable heating and ventilating system for the improved building is diagrammatically illustrated in Fig. 35. In this arrangement each of the internal vertical support units 33 and 34 are provided internally with a hot air duct, as indicated respectively at 170 and 171, extending from the upper surface of the second floor to a location slightly below the lower surface of the first floor. A heater 172 has its outlet duct 173 connected with the hot air duct 171 and has its flue or chimney 61 extending upwardly through the unit 34. Warm air from the heater 172 flows into the duct 171 and through the horizontal support units 64 and 65 and through the duct 170. From the duct 171 the radial conduits 69 lead to the segmental floor sections of the upper and lower floors of the building. Similar radial conduits 60a and 60b lead from the warm air duct 170 into the segmental floor units at the opposite end of the building. At the same time warm air in the horizontal support units 64 and 65 flows into the rectangular first and second floor units and from all of the floor units the warm air escapes through the apertures in the outer end portions of the units and flows through the grooves 140 and 141 into the interior of the building.

The cold air return to the heater 172 is provided by apertures, as indicated at 172, 173, 174 and 175, in the internal vertical support units, positioned preferably slightly above the upper surface levels of the first and second floors of the building. Cold air flowing through these apertures into the interior of the internal vertical support units passes through these units outside of the warm air conduits 170 and 171 to a connecting duct 176 below the unit 64, unit 176 being connected through a conduit 177 to the lower portion of the heater 172. This arrangement will provide a free flow of heating and ventilating air through the building at all times.

If it should be desired to use the heating system for cooling in the summer time, a suitable valve may be placed in the conduit 176 immediately below the conduit 177 to cut the conduit 177 off from return air from the building and connect it directly with the external air beneath the building.

The inwardly extending bottom plates of the roof sections have portions extending outwardly beyond the corresponding side walls and these portions are provided with adjustable louvres 184 which may be opened to permit air to flow into the attic space and out through apertures 75' and louvres 78 for summer ventilation of the attic space.

Figs. 3 and 4 show suggested internal arrangements of the improved building when used for a dwelling house. Since the partitions do not carry any of the bearing heads of the building they may be set in various desired positions and may be provided in various arrangements to divide the interior space of the house into such room arrangements as may be desired. Since the heating and ventilation of the house is directly connected with the interior vertical support units it is contemplated that the heating equipment will have a definite location and will be enclosed in a suitable utility and heater room, as is clearly shown in Fig. 3. A suitable stairway is also provided which is preferably supported on the internal supporting structure of the building and on the building walls so that it is not necessary to carry any of this weight on the floor structure of the building.

Where relatively heavy fixtures are to be supported, such as bathtubs and toilet bowls in the bathrooms of the building, the floor units at these locations may be reinforced by the use of an additional frame member and the space between two adjacent frame members may be utilized for a conduit in which the plumbing for these fixtures is located. Such channels in the corresponding floor units will be connected with the interior of the internal vertical support units so that the plumbing lines may be run directly from these vertical units into the corresponding floor units. Suitable connectors are provided so that the various plumbing lines and the electric conduits may be conveniently coupled together at the time the floor units are assembled with the internal supporting structure and the wall units of the building.

From the above description it is apparent that the present invention provides a novel building structure which is particularly adapted to prefabricated methods of construction and which, in not attempting to follow the line and arrangement of conventional buildings, obtains the maximum advantage from the improved method of construction which involves prefabrication of the various units at a factory location and assembly of these units into prearranged forms at the building location. As has been illustrated and described, the building has large window areas, each window extending over the greater portion of the width of the respective wall segments in which they are included and having a convenient height so that the maximum amount of light is obtained without having the windows interfere with the furnishing and other arrangements of the rooms.

Referring to Figs. 1 and 2 the house may, if desired, be improved in appearance by the addition of an apron structure 178 which extends entirely around the house immediately below the lower floor windows and has its upper edge included in the lower window sealing strips. This apron structure is preferably provided in segments attached to the various lower floor wall segments of the building and is spaced outwardly from the corresponding wall segments at the bottom thereof and extends downwardly adjacent to or over the upper edge of the outer foundation wall 10. The lower edge of this apron structure may be connected to the outer surfaces of the bottom floor units by a suitable diaphragm member 179. The wall sections of the upper floor of the building may be provided with a suitable ornamental bead 180 extending entirely around the building as is clearly illustrated in Fig. 1.

The straight wall sections of the lower floor portion of the building may be provided with suitable doorways, a front door structure being indicated at 181 in Fig. 1. Door 181 provides a closure for a suitable opening in the panel may be surrounded by a suitable hollow metal structure, as indicated at 182, a bottom edge of which rests upon a suitable flat stoop 183 formed as a part of the outer foundation, provided at the time the outer foundation wall of the building is constructed and secured at its inner edge on the outer ends of the first or lower floor sections at the door sill level, the lower portion of the door structure acting as an apron to conceal the outer ends of the floor frames and sill joints.

What is claimed is:

1. A prefabricated building having semi-circular end portions, vertical internal support units of semi-circular cross-sectional shape concentric with the semi-circular end portions of the building, horizontal support members extending between said vertical support members and connected thereto, curved wall sections disposed in adjoining relationship to each other around said vertical support units and uniformly spaced therefrom, straight wall sections disposed between said curved wall sections at the opposite ends of said building, segmental floor sections connected and supported at their inner ends on said vertical support units and at their outer ends on said curved wall sections, and rectangular floor sections connected and supported at their inner ends on said horizontal internal support units and at their outer ends on said straight wall sections.

2. A low cost prefabricated building of few standardized parts selectively usable for producing a structure of one or more stories, said building comprising a substantially continuous foundation having a pair of generally semi-circular end portions and connecting straight side portions, a pair of hollow columns semi-circular in cross section within said foundation, a central longitudinally disposed supporting member connecting said columns, duplicate hollow floor and hollow wall sections supported upon said foundation and columns, said floor section being composed of duplicate rectangular and duplicate wedge-shaped structures, said wall sections being composed of duplicate curved and duplicate rectangular structures, each column having its curved surface concentric with the adjacent semi-circular end portion of said foundation, and a roof composed of duplicate longitudinally bowed wedge-shaped sections and duplicate longitudinally bowed rectangular sections, said foundation columns, floor, wall, and roof sections being combined in a unitary structure.

3. A prefabricated building having semi-circular portions comprising a vertical internal support unit of semi-circular cross-sectional shape, curved wall sections concentric with the semi-circular support unit, the curved wall sections being disposed in adjoining relationship to each other around said vertical support unit and uniformly spaced therefrom, segmental floor sections connected and supported at their inner ends to said vertical support unit and at their outer ends on said curved wall sections, said wall sections and said segmental floor sections being interchangeable with other wall and floor sections whereby the number of different parts used in construction of different buildings may be held to a minimum.

References Cited in the file of this patent

UNITED STATES PATENTS

| | | |
|---|---|---|
| 223,253 | Soare | Jan. 6, 1880 |
| 223,372 | Miner | Jan. 6, 1880 |
| 1,848,690 | Bayley et al. | May 8, 1932 |
| 1,853,631 | Morton | Apr. 12, 1932 |
| 1,910,264 | Shanley et al. | May 23, 1933 |
| 1,986,980 | Ross | Jan. 8, 1935 |
| 2,003,868 | Shodron | June 4, 1935 |
| 2,119,708 | Greulich | June 7, 1938 |
| 2,171,338 | Henderson | Aug. 29, 1939 |
| 2,177,699 | Fisher | Oct. 31, 1939 |
| 2,181,169 | Bates et al. | Nov. 28, 1939 |
| 2,210,697 | Wilson | Aug. 6, 1940 |
| 2,295,103 | Friedly | Sept. 8, 1942 |
| 2,343,764 | Fuller | Mar. 7, 1944 |
| 2,351,419 | Fuller | June 13, 1944 |
| 2,396,829 | Carpenter | Mar. 19, 1946 |
| 2,433,728 | Attwell | Dec. 30, 1947 |

FOREIGN PATENTS

| | | |
|---|---|---|
| 729,470 | France | of 1932 |